US011458992B2

United States Patent
Batkovic et al.

(10) Patent No.: US 11,458,992 B2
(45) Date of Patent: Oct. 4, 2022

(54) SAFE TRAJECTORY TRACKING IN UNCERTAIN ENVIRONMENTS

(71) Applicant: Zenuity AB, Gothenburg (SE)

(72) Inventors: Ivo Batkovic, Gothenburg (SE); Mohammad Ali, Angered (SE); Mario Zanon, Lucca (IT); Paolo Falcone, Gothenburg (SE)

(73) Assignee: Zenuity AB, Gothenburg (SE)

( * ) Notice: Subject to any disclaimer, the term of this patent is extended or adjusted under 35 U.S.C. 154(b) by 111 days.

(21) Appl. No.: 17/017,870

(22) Filed: Sep. 11, 2020

(65) Prior Publication Data
US 2021/0078596 A1 Mar. 18, 2021

(30) Foreign Application Priority Data
Sep. 13, 2019 (EP) .................................... 19197329

(51) Int. Cl.
*B60W 60/00* (2020.01)
*G05D 1/02* (2020.01)
(52) U.S. Cl.
CPC ....... *B60W 60/0015* (2020.02); *G05D 1/0214* (2013.01); *G05D 1/0217* (2013.01); *G05D 1/0223* (2013.01); *G05D 2201/0213* (2013.01)
(58) Field of Classification Search
CPC ....... B60W 60/0015; B60W 2720/103; B60W 60/0011; G05D 1/0214; G05D 1/0217; G05D 1/0223; G05D 2201/0213; G01C 21/3453; G01C 21/34; G05B 13/042; G05B 13/048
See application file for complete search history.

(56) References Cited

U.S. PATENT DOCUMENTS

| | | |
|---|---|---|
| 2015/0345959 A1 | 12/2015 | Meuleau |
| 2018/0356819 A1 | 12/2018 | Mahabadi et al. |
| 2019/0086930 A1 | 3/2019 | Fan et al. |
| 2019/0220015 A1 | 7/2019 | Phillips et al. |
| 2021/0031760 A1* | 2/2021 | Ostafew ................ B60W 30/09 |

OTHER PUBLICATIONS

Extended European Search Report dated Mar. 6, 2020 for European Patent Application No. 19197329.6, 10 pages.

* cited by examiner

*Primary Examiner* — Rodney A Butler
(74) *Attorney, Agent, or Firm* — Sage Patent Group (57) ABSTRACT

The present disclosure relates to a method for trajectory planning for a vehicle. The method includes obtaining a reference trajectory over a finite time horizon, where the reference trajectory includes a speed reference over time for the finite time horizon. Further, the method includes determining a back-up stop trajectory within the finite time horizon. The back-up stop trajectory has a starting state and terminating in a final state, where the final state is defined as a safe state. The method further includes forming a terminal set of states within the finite time horizon based on at least one predefined constraint, wherein the terminal set of states includes a terminal state that corresponds to the starting state for the back-up stop trajectory. Moreover, the method includes generating a nominal trajectory for at least a portion of the finite time horizon based on a constraint controlled technique.

13 Claims, 4 Drawing Sheets

SAFE TRAJECTORY TRACKING IN UNCERTAIN ENVIRONMENTS

CROSS-REFERENCE TO RELATED APPLICATIONS

The present application for patent claims priority to European Patent Office Application Ser. No. 19197329.6, entitled "SAFE TRAJECTORY TRACKING IN UNCERTAIN ENVIRONMENTS" filed on Sep. 13, 2019, assigned to the assignee hereof, and expressly incorporated herein by reference.

TECHNICAL FIELD

The present disclosure relates to autonomous driving (AD) and advanced driver-assistance systems (ADAS). More specifically, the present disclosure relates to trajectory planning for a vehicle within a drivable area.

BACKGROUND

Today, many vehicles have a variety of driver support functions in the form of advanced driver assistance systems (ADAS). Also, many of these support function form a basis for current and future autonomous drive (AD) functions. Examples of ADAS features or functions include lane departure warning systems, lane centring, lane keeping aid, pilot assist, lane change assistance, parking sensors, pedestrian protection systems, blind spot monitors, adaptive cruise control (ACC), anti-lock braking systems, and so forth. These functions supplement the traditional driver control of the vehicle with one or more warnings or automated actions in response to certain scenarios.

The development of autonomous driving vehicles is fast and there are regularly news and demonstrations of impressive technological progress. However, one of the largest challenges with AD is to ensure that the self-driving vehicle is able to safely plan and execute trajectories.

In more detail, in modern day vehicles, the driver is still a critical component as the driver is responsible for making numerous decisions regarding the safe handling of the vehicle in terms of speed, steering, obstacle recognition and avoidance, and so forth. Thus, in order to realize the vision of fully autonomous operation in the automotive industry, new and improved systems related to all aspects of autonomous drive are needed.

The present disclosure relates to the problem of planning trajectories for a self-driving vehicle that are stable and above all safe, not only for the occupants for the vehicle but also for people in the surrounding environment (pedestrians, other vehicles, cyclists, etc.).

SUMMARY

It is therefore an object of the present disclosure to provide a method for trajectory planning for a vehicle, a computer-readable storage medium, a control device, and a vehicle comprising such a control device, which alleviate all or at least some of the drawbacks of presently known systems.

More specifically, it is an object of the present disclosure to provide a method for trajectory planning for a vehicle which allows the vehicle to drive at higher speeds while still ensuring safety in an improved manner as compared to currently known solutions. Analogously it is an object to provide a corresponding computer-readable storage medium, control device, and a vehicle comprising such a control device.

This object is achieved by means of a method for trajectory planning for a vehicle, a computer-readable storage medium, a control device, and a vehicle comprising such a control device, as defined in the appended claims. The term exemplary is in the present context to be understood as serving as an instance, example or illustration.

According to a first aspect of the present disclosure, there is provided a method for trajectory planning for a vehicle. The method comprises obtaining a reference trajectory over a finite time horizon, where the reference trajectory comprises a speed reference over time for the finite time horizon. Further, the method comprises determining a back-up stop trajectory within the finite time horizon. The back-up stop trajectory has a starting state and terminating in a final state, where the final state is defined as a safe state. The method further comprises forming a terminal set of states within the finite time horizon based on at least one predefined constraint, wherein the terminal set of states comprises a terminal state that corresponds to the starting state for the back-up stop trajectory. Moreover, the method comprises generating a nominal trajectory for at least a portion of the finite time horizon based on a constraint controlled technique, where the nominal trajectory is dependent on the obtained reference trajectory and a terminal constraint. The terminal constraint defines that the nominal trajectory comprises the terminal state. The constraint controlled technique comprises a cost minimizing control strategy, and the back-up stop trajectory from the starting state to the final state is associated with zero cost. The proposed method provides a trajectory planning solution that achieves a good compromise between stability (able to accurately track a reference) and safety (the finite time horizon always includes a back-up stop trajectory), based on a constraint controlled technique (such as e.g. model predictive control (MPC) framework).

In accordance with the proposed method, the back-up stop part mainly serves to ensure that the vehicle is able to reach a safe state (e.g. standstill) within the finite time horizon. Moreover, by forming the terminal set of states and forcing the nominal trajectory planning to always include a terminal state from this set, the cost associated with the back-up stop trajectory can be alleviated. Without the terminal set of states, a conventional MPC-based control strategy would sacrifice stability (i.e. deviate from the reference trajectory) because of the cost associated with the back-up stop trajectory.

However, the present inventors realized that if one sets a terminal constraint, i.e. a constraint that the generated nominal trajectory has to include one of the states from the terminal set of states, the trajectory (for the duration of the finite time horizon) can be considered to be "safe". An advantageous effect is then that the back-up stop trajectory does not need to induce any costs and thereby not affect the nominal part of the generated trajectory, and stability is achievable. However, if one encounters a situation, where one must start executing a back-up stop trajectory, the terminal set of states only starts to include states outside of the "reference trajectory" and since the generated trajectory must include one state from the terminal set, a cost is induced and the nominal trajectory starts to deviate from the reference trajectory (i.e. stability is sacrificed in favour of safety).

A trajectory may in the present context to be understood as a time-dependent path. Considering the one-dimensional (1D) case where our reference parameter is a speed parameter for a vehicle, then the trajectory is defined as the speed values assumed or to be assumed by the vehicle within a specified time period (discrete or continuous).

The term finite time horizon is to be understood as a time horizon of a defined length, preferably of a predetermined length (for example, 5 seconds, 10 seconds, 15 seconds). The finite time horizon stretches from a current point in time (t=0) to an end time (t=$t_{end}$), in the case where the length of the finite time horizon is 10 seconds, then $t_{end}$=10 s. The finite time horizon may also be referred to as a prediction horizon.

According to a second aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure there is provided a control device for trajectory planning for a vehicle. The control device comprises control circuitry configured to obtain a reference trajectory over a finite time horizon. The reference trajectory comprises a speed reference over time for the finite time horizon. The control circuitry is further configured to determine a back-up stop trajectory within the finite time horizon, where the back-up stop trajectory has a starting state and a final state. The final state is defined as a safe state. Further, the control circuitry is configured to form a terminal set of states within the finite time horizon based on at least one predefined constraint. The terminal set of states comprises at least one terminal state that corresponds to the starting state for the back-up stop trajectory. Still further, the control circuitry is configured to generate a nominal trajectory for at least a portion of the finite time horizon based on a constraint controlled technique. The nominal trajectory is dependent on the obtained reference trajectory and a terminal constraint. The terminal constraint defines that the nominal trajectory comprises the terminal state. Moreover, the constraint controlled technique comprises a cost minimizing control strategy, and wherein the back-up stop trajectory from the starting state to the final state is associated with zero cost. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1:
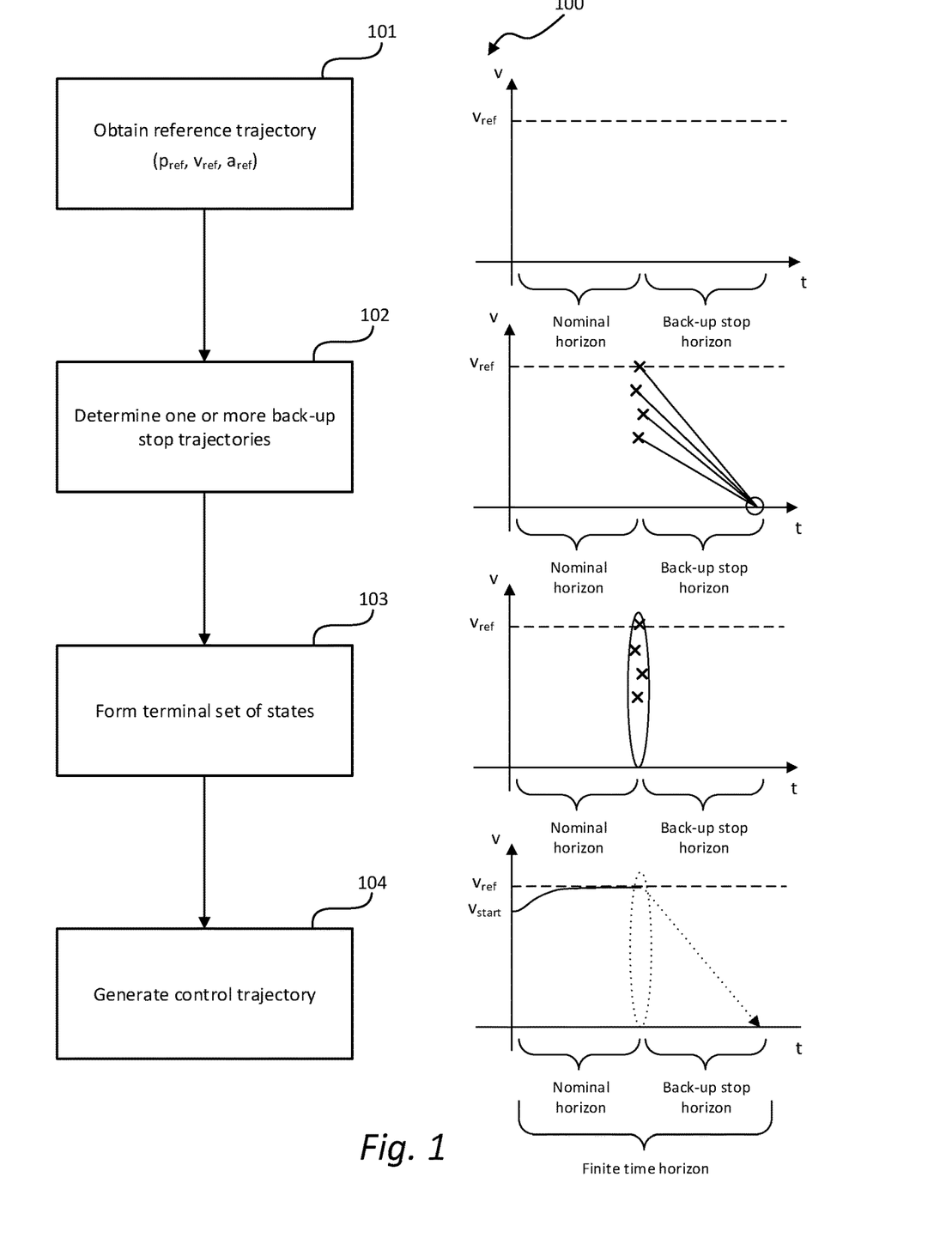
FIG. 1 is a schematic flow chart illustration of a method for trajectory planning for a vehicle in accordance with an embodiment of the present disclosure.

FIG. 1 shows a schematic flow chart representation of a method 100 for controlling an advanced driver-assistance feature (ADAS) or autonomous driving (AD) feature for a vehicle traveling on a road segment according to an example embodiment of the present disclosure. More specifically, the method 100 provides for a trajectory tracking/generating feature for an autonomous or semi-autonomous vehicle (i.e. vehicle equipped with ADAS). A vehicle is in the present context to be interpreted broadly and includes cars, buses, trucks, and construction vehicles.

Even though the present disclosure is focused on vehicles, and particularly on cars, the teachings herein are applicable to other industries utilizing trajectory planning such as e.g. robotics, avionics, etc.

The method 100 comprises obtaining 101 a reference trajectory over a finite time horizon. The reference trajectory comprises at least a speed reference ($v_{ref}$) over time for the finite time horizon. The reference trajectory may alternatively or additionally comprise a positional reference ($p_{ref}$), a yaw reference ($\Theta_{ref}$), an acceleration reference ($a_{ref}$), and so forth.

The positional reference is preferable in the form of a set of x-positions and y-position in the road surface. These alternative or additional parameters may be used for example to generate steering input for following a target path. The reference trajectory may be given based on a current traffic scenario (e.g. based on the geographical position of the vehicle and surrounding traffic), and may be predefined or dynamic based on sensor observations. Thus, the reference trajectory may be part of (local) "map data" and may for example be obtained from an external entity (that is part of a vehicle management system) via an external network (e.g. a cellular network).

The term finite time horizon is to be understood as a time horizon of a defined length, preferably of a predetermined length (for example, 5 seconds, 10 seconds, 15 seconds). The finite time horizon stretches from a current point in time (t=0) to an end time (t=$t_{end}$), in the case where the length of the finite time horizon is 10 seconds, then $t_{end}$=10 s. The finite time horizon may also be referred to as a prediction horizon.

Further, the method 100 comprises determining 102 one or more back-up stop trajectories (may also be referred to as a safe-stop trajectory) within the finite time horizon. The back-up stop trajectory has a starting state and terminates in a final state. The final state of each back-up stop trajectory is defined a safe state. In one example embodiment of the present disclosure, the final state is a state in which a speed of the vehicle is zero. However, the method can be used for other applications as well (e.g. robotics), in that case a safe state may for example be when the robotic unit (e.g. robotic arm) reaches a predefined position and/or configuration (e.g. fully opened grip). In accordance with one example embodiment context, a back-up stop trajectory is in a maximum deceleration trajectory of the vehicle, i.e. going from a first vehicle speed to stand-still as fast as possible. Thus, the back-up stop trajectory may be construed as an emergency stop action, where the priority is to bring the vehicle to a stand-still as fast as possible with reduced consideration given to occupant comfort.

Further, the method 100 comprises forming 103 a terminal set of states within the finite time horizon based on at least one predefined constraint. The terminal set of states comprises at least one terminal state that corresponds to the starting state for the back-up stop trajectory. The at least one predefined constraint may for example be a road geometry of a surrounding environment of the vehicle, a maximum deceleration capacity of the vehicle, or weather data.

Stated differently, when forming the terminal set of states vehicle dynamics, road conditions, and/or reference trajectory speed may be considered. In more detail, each state in the terminal set must fulfil the condition of being able to reach the final state (safe state, e.g. vehicle speed is zero). Thus, in order to ensure that this is possible, various vehicle characteristics such as vehicle weight, brake capacity, road conditions, etc. may be accounted for. These various characteristics define the one or more constraints used to form the terminal set of states.

Next, a nominal trajectory for at least a portion of the finite time horizon is generated 104 based on a constraint controlled technique. The constraint controlled technique may be based on a model predictive control (MPC) framework. However, other techniques are also possible to employ such as for example reference and command governors. The nominal trajectory is dependent on the obtained reference trajectory and a terminal constraint, wherein the terminal constraint defines that the control trajectory comprises a state from the terminal set of states. Furthermore, the constraint controlled technique comprises a cost minimizing control strategy, and wherein the back-up stop trajectory from the terminal state to the final state is associated with zero cost.

In other words, the proposed method 100 provides a trajectory planning solution which ensures that there is always "a safe trajectory" (i.e. a back-up stop trajectory) within the finite time horizon, without sacrificing stability. In more detail, as long as one does not need to "follow" the back-up stop trajectory, the controller is "stabilizing" (i.e. the nominal trajectory converges to the reference trajectory) since the back-up stop trajectory is not associated with any cost. The terminology that one does "not need to follow the back-up stop trajectory" may be understood as that the back-up stop trajectory does not need to be initiated at a subsequent time sample (this will be further exemplified and elaborated upon in reference to FIG. 2).

Accordingly, an advantage of the proposed method is that it is possible to realize a trajectory planning module that achieves a good compromise between stability (able to accurately track a reference) and safety (the finite time horizon always includes an executable back-up stop trajectory which is guaranteed by the inclusion of a terminal state in the generated target trajectory (nominal trajectory). In other solutions, in order to be able to guarantee safety, the back-up stop trajectory is included in the finite time horizon. However, the mere inclusion of a "back-up stop trajectory" within the finite time horizon would, in these prior solutions, force the trajectory planning module to deviate from the reference trajectory. This is because an emergency brake action is associated with high costs, and since the cost minimizing control strategy finds the optimal trajectory by minimizing costs, it will sacrifice convergence to the reference trajectory in order to avoid being exposed to "emergency brake situations". Even if the back-up stop trajectory isn't a maximum deceleration trajectory (emergency brake action) it would still induce costs and impair the ability to stabilize against a high speed reference trajectory.

Moreover, guaranteeing safety for an infinite time horizon is likely impossible, so a challenge contemplated in the present disclosure is how to "guarantee" safety for a finite time horizon without sacrificing stability (e.g. driving unreasonably slow).

The present inventors realized that the probability of being exposed to "emergency brake" situations is relatively low, wherefore one does not need a trajectory planning system that generates target trajectories that are based on the assumption that there is an emergency stop present in every planning horizon. Thus, by forming the terminal set of states and ensuring that the nominal trajectory always includes one of these terminal states, but with the twist of assigning no cost the back-up stop trajectory, the trajectory planning module is allowed to focus on stabilizing the nominal trajectory w.r.t. the reference trajectory and still be able to ensure that the "safe state" can be reached within the finite time horizon.

Stated differently, the method generates a nominal trajectory based on a constraint controlled strategy that only needs to include one of the terminal states in order to be able to say (with high probability) that the generated trajectory is "safe" within the prediction horizon (finite time horizon). Thus, the back-up stop trajectory does not need to include any costs since the definition of the terminal state is that as long as the vehicle can reach it, it can also execute the back-up stop trajectory (and thereby reach the safe state). Thus, it can be said that it is the terminal set of states that provides the necessary freedom to stabilize the nominal trajectory without sacrificing the safety of the trajectory planning module.

Executable instructions for performing these functions are, optionally, included in a non-transitory computer-readable storage medium or other computer program product configured for execution by one or more processors.

Figure 2:
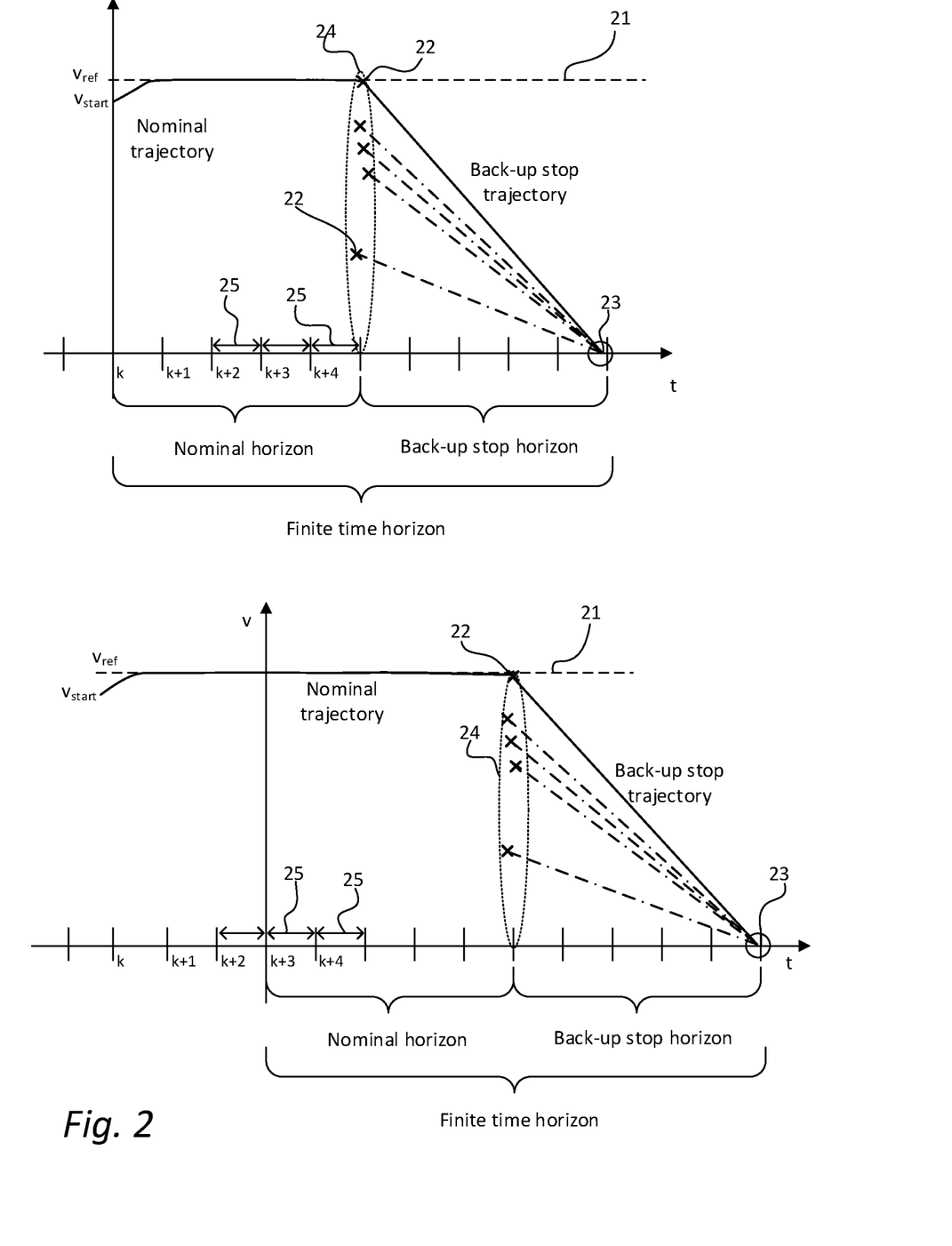
FIG. 2 shows two schematic graphs illustrating an exemplary embodiment of a method for trajectory planning for a vehicle in accordance with an embodiment of the present disclosure.

FIG. 2 shows two schematic graphs illustrating an exemplary embodiment of a method for trajectory planning for a vehicle traveling on a road segment. In more detail, the top graph shows the generated trajectory at a time t=k while the bottom graph shows the generated trajectory at a subsequent time step t=k+3, i.e. three sample times 25 later. The graphs include a reference trajectory in the form of a speed reference $v_{ref}$ indicated by the broken line 21. The sample time is set based on application and specifications and may for example be 1 ms, 10 ms, or 100 ms, which would correspond to a sample rate of 1000 Hz, 100 Hz or 10 Hz, respectively.

Thus, once the reference trajectory 21 is obtained over the finite time horizon, at least one back-up stop trajectory within the finite time horizon is determined. The back-up stop trajectory has a starting state 22 and terminates in a final state 23, the final state is defined as a safe state (here as a state in which the vehicle's speed is zero). In the present context, a vehicle state in which the vehicle does not move is considered "safe". This is because a vehicle standing still is not responsible for being hit by another road user. One can compare with other technological fields such as for example a chemical reactor which is shut down is often considered safe, an electric circuit which is switched off can be considered as safe, or a ship docked in a port can be considered as safe.

Further, a terminal set of states 22 is formed within the finite time horizon based on at least one constraint. The terminal set of states comprises at least one terminal state 22 that corresponds to the starting state of the back-up stop trajectory. It can be said that the terminal states are formed based on a set of constraints or criteria (e.g. vehicle dynamics, road geometry, passenger comfort, etc.) in order to ensure that the safe state can be reached. Accordingly, the terminal state(s) may be one or more vehicle states (position, speed, and heading angle) that the vehicle must assume if it is to reach the safe state in accordance with an estimated trajectory. Alternative back-up stop trajectories are indicated by the broken lines between a corresponding terminal state 22 and the final state 23. In the illustrated example, the selected terminal state corresponds to a starting state of a back-up stop trajectory in the form of a maximum deceleration trajectory.

In more detail, an outer boundary of the terminal set of states is a starting state for a maximum deceleration trajectory. It is generally this trajectory that allows for the highest speed for the starting state. In one exemplary embodiment, the back-up stop trajectory is a maximum deceleration trajectory (may also be referred to as an emergency brake trajectory). For a back-up stop trajectory in the form of a maximum deceleration trajectory little or no regard is given to passenger comfort. By selecting a back-up stop trajectory in the form of a maximum deceleration trajectory, the nominal trajectory has the best possibility to stabilize against high reference speeds.

Further, the nominal trajectory (here represented by a vehicle speed parameter) is generated for at least a portion of the finite time horizon based on a constraint controlled technique. The nominal trajectory is at least dependent on the obtained reference trajectory 21 and a terminal constraint. The terminal constraint defines that the nominal trajectory comprises a state 22 from the terminal set of states 24. As mentioned above, the constraint controlled technique comprises a cost minimizing control strategy, and wherein the back-up stop trajectory from the starting state (corresponding to a terminal state) to the final state is associated with zero cost. Naturally, the nominal trajectory may be further based on other constraints depending on the intended application and specification related thereto. For example, various vehicle parameters may define additional constraints (maximum acceleration, turning radius, vehicle dimensions, etc.), furthermore user preferences may also dictate other constraints related to comfort (e.g. lateral acceleration, vertical acceleration, and so forth).

Still further, the finite time horizon comprises a nominal time horizon (defined as a first portion of the finite time horizon) and a back-up stop time horizon (defined as a second portion of the finite time horizon). Preferably, the nominal trajectory is comprised within the nominal time horizon and the back-up stop trajectory is comprised within the back-up stop time horizon.

The ratio between the nominal time horizon and the back-up stop horizon may be set based on user-preferences and/or based on a current surrounding environment of the vehicle (e.g. highway cruising, rush-hour traffic in densely populated areas, etc.). For example, if the finite time horizon is ten seconds (or any other suitable value depending on the performance of the vehicle's perception system), then the nominal time horizon may be five seconds and the back-up stop time horizon may be five seconds, i.e. a 50/50 ratio. However, other ratios are feasible, such as e.g. 60/40, 40/60, 70/30, 30/70, and so forth.

As discussed in the foregoing, as long there is a back-up stop trajectory accounted for in the finite time horizon improvements with regards to occupant safety are achievable. Moreover, as long as one does not need to execute the back-up stop trajectory, the controller (operating under a constraint controlled technique) is "stabilizing" (e.g. the vehicle is allowed to converge towards the reference speed). Thus, during "normal" operation, the safe state 23 is set at an end of the finite time horizon during each sample/update/iteration of the trajectory planning. This is further illustrated by the bottom graph, where the finite time horizon is just moved forward in time with every update. An important aspect to consider is that one has "planned" for a back-up stop trajectory within the finite time horizon, i.e. the vehicle can reach a safe state within the finite time horizon. Thus, by means of the proposed method it can be argued that it is ensured that the vehicle can always reach a "safe state" within the planning horizon, and still maintain good stabilizing properties for the nominal trajectory planning.

However, if the vehicle sensors would detect an unexpected obstacle blocking the vehicle target path (e.g. pedestrian crossing a street), then the safe state, and consequently the back-up stop trajectory will propagate "inwards" into the nominal time horizon and thereby start to induce a cost for the generation of the nominal trajectory. More specifically, the formation (or shape) of the terminal set of states will be affected, which in turn will affect the nominal trajectory. In that case, the nominal trajectory will start to deviate from the reference trajectory 21 (e.g. the vehicle speed will be reduced) in order to account for the costs associated with new set of terminal states 22. This is illustrated in FIG. 3, which shows a graph illustrating a method for trajectory planning for a vehicle.

Figure 3:
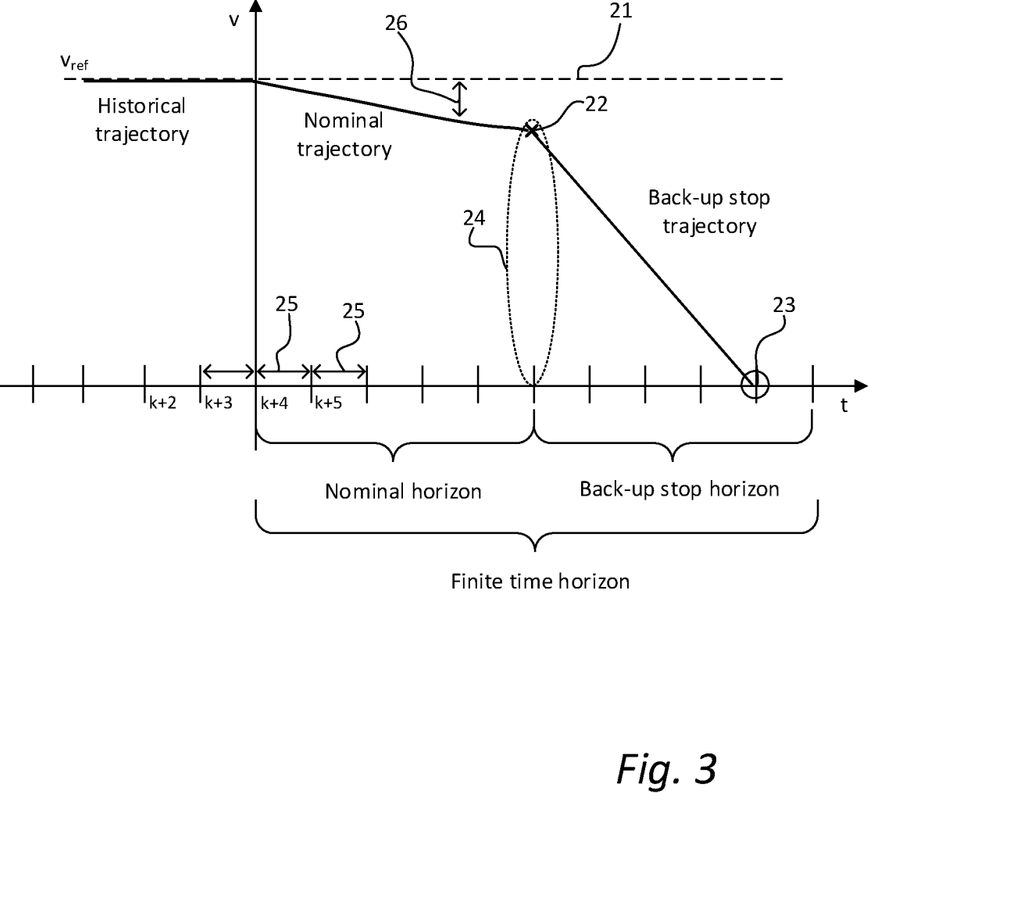
FIG. 3 shows a schematic graph illustrating an exemplary embodiment of a method for trajectory planning for a vehicle in accordance with an embodiment of the present disclosure.

More specifically, the graph of FIG. 3 illustrates an example scenario or situation where an obstacle is detected (e.g. by the vehicle's perception system) in a subsequent time sample 25 continuing from the bottom graph of FIG. 2. The detection of the obstacle forces the trajectory planning module to plan to come to a stand-still state 23 sooner than in the previous time sample 25 (bottom graph of FIG. 2). Thus, the back-up stop trajectory is adjusted, and the terminal set of states 24 is correspondingly updated. As a consequence, the vehicle cannot reach the safe state with a maximum deceleration from the reference speed ($v_{ref}$), and the terminal state 22 closest to the reference trajectory 21 differs from the reference trajectory 21 enough to cause the trajectory planning module to sacrifice stability (indicated by the double-headed arrow 26) for safety when generating the nominal trajectory.

Stated differently, the terminal set of states 24 only includes states outside of the "reference trajectory" and since the generated nominal trajectory must include one state form the terminal set of states 24, a cost is induced and the nominal trajectory starts to deviate from the reference trajectory 21 (i.e. stability is sacrificed in favour of safety).

Moreover, in another exemplary embodiment, the method comprises obtaining a predicted trajectory of at least one dynamic objected (e.g. pedestrian, cyclist, other vehicle, etc.) located in a surrounding environment of the vehicle. The predicted trajectory may for example be formed based on sensor data obtained from at least one sensor and a predefined (motion) model. Accordingly, the terminal set of states is formed further based on each predicted trajectory. The sensor data may originate from on-board sensors of the ego-vehicle (e.g. radar, LIDAR, cameras, etc.), from connected infrastructure devices (e.g. traffic lights, traffic cameras, tolling systems, etc.), and/or from other vehicles accessible via a vehicle-to-vehicle (V2V) solution. Thus, at each sample time a current traffic scenario is taken into account when populating the terminal set of states with terminal states. The illustrated examples of FIG. 2 and FIG. 3 show scenarios where the nominal trajectory includes a terminal state 22 corresponding to a back-up stop trajectory in the form of a maximum deceleration, the skilled reader readily realizes that other terminal states 22 within the terminal set of states may be chosen to be included in the nominal trajectory. The selection of which terminal state to be included in the nominal trajectory generation may be based on predefined preferences and specific scenarios (user settings, environmental data, etc.). Moreover, as illustrated through FIGS. 2-3, the "shape" of the terminal set of states 24 is dynamic, and it can be said that the "shape" of the terminal set of states 24 affects the "stability" (i.e. ability to accurately track the reference trajectory 21) of the nominal trajectory. The shape of the terminal set of states can accordingly be affected by external objects appearing or disappearing in the surrounding environment of the vehicle.

Figure 4:
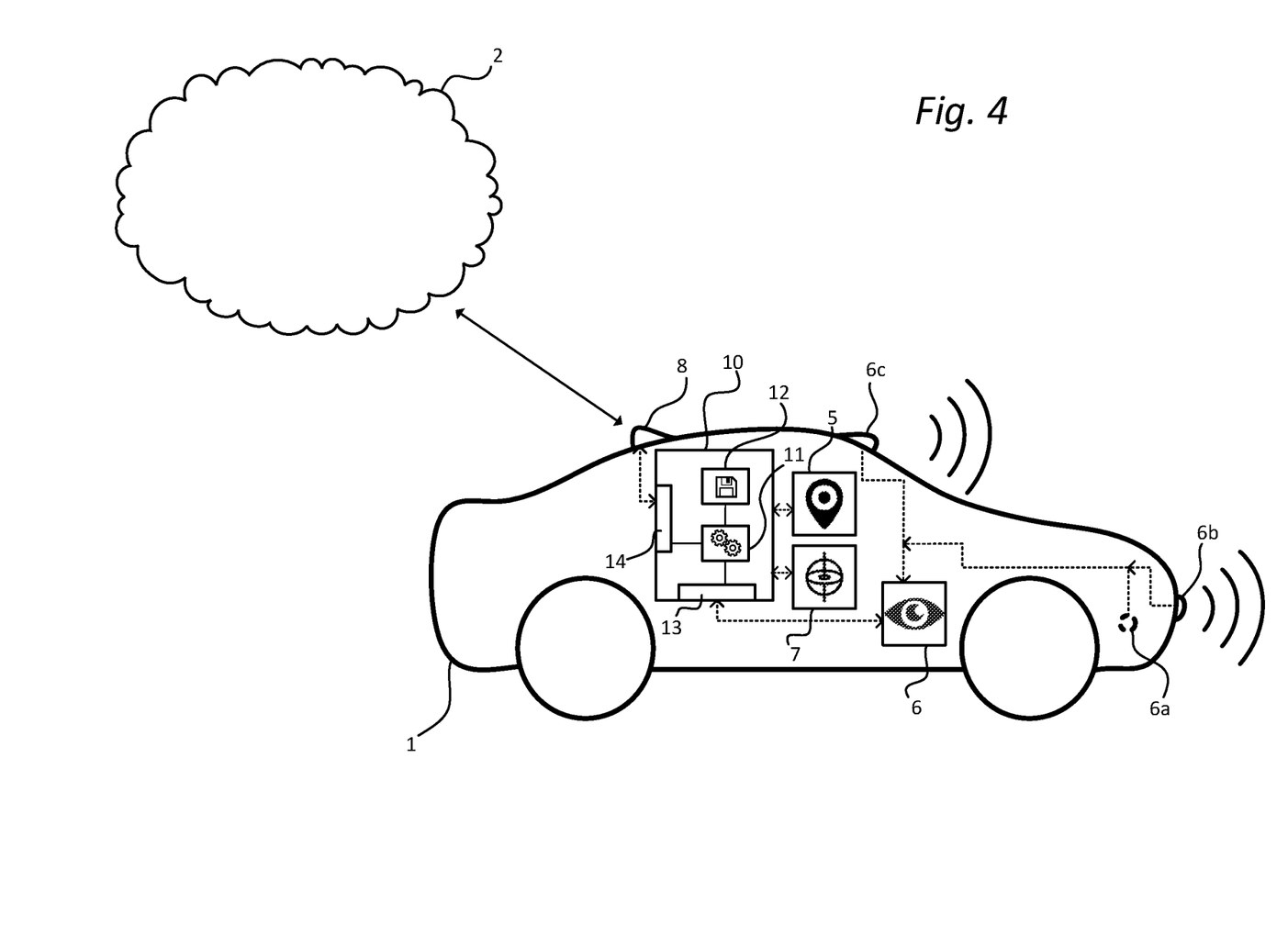
FIG. 4 is a schematic side view of a vehicle having a control device for lane-level map matching for a vehicle traveling on a road in accordance with an embodiment of the present disclosure.

FIG. 4 is a schematic side view of a vehicle 1 comprising a control device 10 device for controlling an advanced driver-assistance (ADAS) feature or autonomous driving (AD) feature for a vehicle 1 traveling on a road segment. The ADAS or AD feature may for example be a trajectory planning feature. The vehicle 1 further comprises a perception system 6, an inertial measurement unit (IMU) 7, and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively realized as a Real Time Kinematics (RTK) GPS in order to improve accuracy. An IMU 7 is to be understood as an electronic device configured to measure the inertial movement of the vehicle 1. An IMU 7 usually has six degrees of freedom, three accelerometers and three gyroscopes.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for trajectory planning for a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain a reference trajectory over a finite time horizon, the reference trajectory comprising a speed reference over time for the finite time horizon. The reference trajectory may for example be obtained from a local memory unit 12 or from a remote server 2 via an external network accessible by a vehicle-mounted antenna 8. Further, the control circuitry 11 is configured to determine a back-up stop trajectory within the finite time horizon. The back-up stop trajectory having a starting state and a final state, the final state is herein defined as a safe state.

Next, the control circuitry 11 is configured to form a terminal set of states within the finite time horizon based on at least one predefined constraint. The terminal set of states comprises at least one terminal state that corresponds to the starting state for the back-up stop trajectory. Moreover, the control circuitry 11 is configured to generate a nominal trajectory for at least a portion of the finite time horizon based on a constraint controlled technique (e.g. MPC). The nominal trajectory is dependent on the obtained reference trajectory and a terminal constraint. The terminal constraint defines that the nominal trajectory comprises the terminal state. The constraint controlled technique comprises a cost minimizing control strategy, and the back-up stop trajectory from the starting state to the final state is associated with zero cost.

Further, the vehicle 1 may be connected to external network(s) 2 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 5. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps determining one or more back-up stop trajectories and forming the terminal set of states. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for trajectory planning for a vehicle, the method comprising:
   obtaining a reference trajectory over a finite time horizon, the reference trajectory comprising a speed reference over time for the finite time horizon;
   determining a back-up stop trajectory within the finite time horizon, the back-up stop trajectory having a starting state and terminating in a final state, the final state being defined as a safe state;

forming a terminal set of states within the finite time horizon based on at least one predefined constraint, wherein the terminal set of states comprises a terminal state that corresponds to the starting state for the back-up stop trajectory;

generating a nominal trajectory for at least a portion of the finite time horizon based on a constraint controlled technique, the nominal trajectory being dependent on the obtained reference trajectory and a terminal constraint, wherein the terminal constraint defines that the nominal trajectory comprises the terminal state, wherein the constraint controlled technique comprises a cost minimizing control strategy, and wherein the back-up stop trajectory from the starting state to the final state is associated with zero cost; and controlling the vehicle based on the generated nominal trajectory.

2. The method according to claim 1, wherein the back-up stop trajectory is associated with zero cost for the generated nominal trajectory as long as the corresponding terminal state of the terminal set of states is comprised in the nominal trajectory.

3. The method according to claim 1, wherein the nominal trajectory ends with a terminal state from the terminal set of states.

4. The method according to claim 1, wherein the constraint controlled technique is based on a model predictive control, MPC, framework.

5. The method according to claim 1, wherein the finite time horizon comprises a nominal time horizon defined as a first portion of the finite time horizon, and a back-up stop time horizon defined as a second portion of the finite time horizon, the first portion preceding the second portion; and wherein the nominal trajectory is comprised within the nominal time horizon and the back-up stop trajectory is comprised within the back-up stop time horizon.

6. The method according to claim 5, wherein the first portion is a first predefined time period of the finite time horizon and wherein the second portion is a second predefined time period of the finite time horizon, the first predefined time period and the second predefined time period being equal to a total time of the finite time horizon.

7. The method according to claim 1, wherein the final state is a state in which a speed of the vehicle is zero.

8. The method according to claim 1, wherein the at least one predefined constraint comprises at least one of a road geometry of a surrounding environment of the vehicle, a maximum deceleration capacity of the vehicle, and weather data.

9. The method according to claim 1, further comprising:
for a first time sample, sending a signal in order to control a speed of the vehicle based on the generated nominal trajectory; and
shifting the finite time horizon forward in time by one time sample; and
repeating the method according to any one of the preceding claims where the finite time horizon is replaced by the shifted finite time horizon.

10. The method according to claim 1, further comprising:
obtaining a predicted trajectory of at least one dynamic object located in a surrounding environment of the vehicle, wherein the predicted trajectory is based on sensor data obtained by at least one sensor and a predefined model; and
wherein the terminal set of states is formed further based on each predicted trajectory.

11. A computer-readable storage medium storing one or more instructions configured to be executed by one or more processors of a vehicle control system, the one or more instructions for performing the method for trajectory planning for a vehicle, the method comprising:
obtaining a reference trajectory over a finite time horizon, the reference trajectory comprising a speed reference over time for the finite time horizon;
determining a back-up stop trajectory within the finite time horizon, the back-up stop trajectory having a starting state and terminating in a final state, the final state being defined as a safe state;
forming a terminal set of states within the finite time horizon based on at least one predefined constraint, wherein the terminal set of states comprises a terminal state that corresponds to the starting state for the back-up stop trajectory;
generating a nominal trajectory for at least a portion of the finite time horizon based on a constraint controlled technique, the nominal trajectory being dependent on the obtained reference trajectory and a terminal constraint, wherein the terminal constraint defines that the nominal trajectory comprises the terminal state,
wherein the constraint controlled technique comprises a cost minimizing control strategy, and wherein the back-up stop trajectory from the starting state to the final state is associated with zero cost; and
controlling the vehicle based on the generated nominal trajectory.

12. A control device for trajectory planning for a vehicle, the control device comprising control circuitry configured to:
obtain a reference trajectory over a finite time horizon, the reference trajectory comprising a speed reference over time for the finite time horizon;
determine a back-up stop trajectory within the finite time horizon, the back-up stop trajectory having a starting state and a final state, the final state being defined as a safe state;
form a terminal set of states within the finite time horizon based on at least one predefined constraint, wherein the terminal set of states comprises a terminal state that corresponds to the starting state for the back-up stop trajectory;
generate a nominal trajectory for at least a portion of the finite time horizon based on a constraint controlled technique, the nominal trajectory being dependent on the obtained reference trajectory and a terminal constraint, wherein the terminal constraint defines that the nominal trajectory comprises the terminal state,
wherein the constraint controlled technique comprises a cost minimizing control strategy, and wherein the back-up stop trajectory from the starting state to the final state is associated with zero cost; and
control the vehicle based on the generated nominal trajectory.

13. A vehicle comprising a control device according to claim 12.

* * * * *